US012598036B2

(12) United States Patent
Laddu et al.

(10) Patent No.: US 12,598,036 B2
(45) Date of Patent: Apr. 7, 2026

(54) BEAM REPORTING ENHANCEMENT FOR SIMULTANEOUS IAB RECEPTION

(71) Applicant: Nokia Solutions and Networks Oy, Espoo (FI)

(72) Inventors: Keeth Saliya Jayasinghe Laddu, Espoo (FI); Kevin Wanuga, Souderton, PA (US); Juha Sakari Korhonen, Espoo (FI); Mark Cudak, Rolling Meadows, IL (US); Ilkka Antero Keskitalo, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 348 days.

(21) Appl. No.: 18/249,878

(22) PCT Filed: Oct. 11, 2021

(86) PCT No.: PCT/EP2021/078000
§ 371 (c)(1),
(2) Date: Apr. 20, 2023

(87) PCT Pub. No.: WO2022/084079
PCT Pub. Date: Apr. 28, 2022

(65) Prior Publication Data
US 2023/0421316 A1 Dec. 28, 2023

Related U.S. Application Data

(60) Provisional application No. 63/094,491, filed on Oct. 21, 2020.

(51) Int. Cl.
*H04L 5/00* (2006.01)
*H04B 7/0408* (2017.01)
(Continued)

(52) U.S. Cl.
CPC ......... *H04L 5/0035* (2013.01); *H04B 7/0408* (2013.01); *H04B 7/0696* (2023.05); *H04W 72/1268* (2013.01); *H04W 88/085* (2013.01)

(58) Field of Classification Search
CPC ............ H04W 72/1268; H04W 88/085; H04L 5/0035; H04B 7/0408; H04B 7/0621; H04B 7/15528; H04B 7/0695
See application file for complete search history.

(56) References Cited

U.S. PATENT DOCUMENTS

| | | | |
|---|---|---|---|
| 10,735,057 B1 * | 8/2020 | Zhao ...................... | H04B 7/024 |
| 11,271,699 B1 * | 3/2022 | Eyuboglu ............. | H04L 1/1819 |

(Continued)

FOREIGN PATENT DOCUMENTS

WO 2020/198692 A1 10/2020

OTHER PUBLICATIONS

"3rd Generation Partnership Project; Technical Specification Group Radio Access Network; NR; Physical layer procedures for data (Release 16)", 3GPP TS 38.214, V16.2.0, Jun. 2020, pp. 1-163.
(Continued)

*Primary Examiner* — Phong La
(74) *Attorney, Agent, or Firm* — McCarter & English, LLP

(57) ABSTRACT

According to an example aspect of the present disclosure, there is provided a method comprising performing with a first node beam measurement for downlink beams received with the first node from at least one second node, scheduling with the first node at least one third node for uplink transmission to the first node, determining with the first node
(Continued)

one or more of the downlink beams that can be received simultaneously with a beam of the at least one third node based at least partially on the scheduling of the at least one third node and the performing of the beam measurement, and transmitting with the first node results of the performed beam measurement wherein the results comprise an indication of the one or more determined downlink beams that can be received simultaneously with the beam of the at least one third node.

20 Claims, 9 Drawing Sheets

(51) Int. Cl.

| | | |
|---|---|---|
| *H04B 7/06* | (2006.01) | |
| *H04W 72/1268* | (2023.01) | |
| *H04W 88/08* | (2009.01) | |

(56) References Cited

U.S. PATENT DOCUMENTS

| | | | |
|---|---|---|---|
| 2019/0373627 | A1* | 12/2019 | Luo ..................... H04W 72/542 |
| 2019/0394084 | A1 | 12/2019 | Tsai et al. |
| 2020/0052775 | A1 | 2/2020 | Nam et al. |
| 2020/0220585 | A1 | 7/2020 | John Wilson et al. |
| 2020/0337048 | A1* | 10/2020 | Abedini ............... H04W 72/23 |
| 2021/0045170 | A1* | 2/2021 | Luo ....................... H04W 24/08 |
| 2021/0067979 | A1* | 3/2021 | Rahman ............... H04L 5/0023 |
| 2021/0152418 | A1* | 5/2021 | Abdelghaffar ....... H04B 7/0602 |
| 2022/0046638 | A1* | 2/2022 | Cudak ............... H04B 7/15542 |
| 2023/0345553 | A1* | 10/2023 | Maya ............... H04W 56/0045 |
| 2023/0421316 | A1* | 12/2023 | Laddu .................. H04L 5/0035 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

"Summary on email discussion on beam management for simultaneous multi-TRP transmission with multiple Rx panels", 3GPP TSG RAN WG1 Meeting #102-e, R1-2007294, Agenda: 8.1.2.3, CATT, Aug. 17-28, 2020, 21 pages.

Park et al., "Optimal Beamforming With Limited Feedback for Millimeter-Wave in-Band Full-Duplex Mobile X-Haul Network", IEEE Access, vol. 6, Sep. 12, 2018, pp. 51038-51048.

"Resource management for enhanced duplexing", 3GPP TSG RAN WG1 Meeting #102-e, R1-2006825, Agenda: 8.10.1, Qualcomm Incorporated, Aug. 17-28, 2020, 6 pages.

"Resource multiplexing between backhaul and access for IAB duplexing enhancements", 3GPP TSG RAN WG1 Meeting #102-e, R1-2005260, Agenda: 8.10.1, Huawei, Aug. 17-28, 2020, 7 pages.

Łukowa et al., "Dynamic In-band Self-backhauling for 5G Systems with Inter-cell Resource Coordination", International Journal of Wireless Information Networks, vol. 26, Oct. 23, 2019, 12 pages.

Suk et al., "Full Duplex Integrated Access and Backhaul for 5G NR: Analyses and Prototype Measurements", arXiv, Jul. 7, 2020, pp. 1-8.

International Search Report and Written Opinion received for corresponding Patent Cooperation Treaty Application No. PCT/EP2021/078000, dated Feb. 3, 2022, 12 pages.

"Discussion on CSI framework for NR", 3GPP TSG RAN WG1 Meeting #88, R1-1702455, Agenda: 8.1.2.3.1, LG Electronics, Feb. 13-17, 2017, pp. 1-6.

"SDM scheme and antenna configuration for IAB node", 3GPP TSG RAN WG1 #102-e, R1-2006622, Agenda: 8.10.3, ZTE, Aug. 17-28, 2020, 2 pages.

Office Action received for corresponding Indian Patent Application No. 202347034117, dated Mar. 4, 2024, 6 pages.

* cited by examiner

Figure 4:
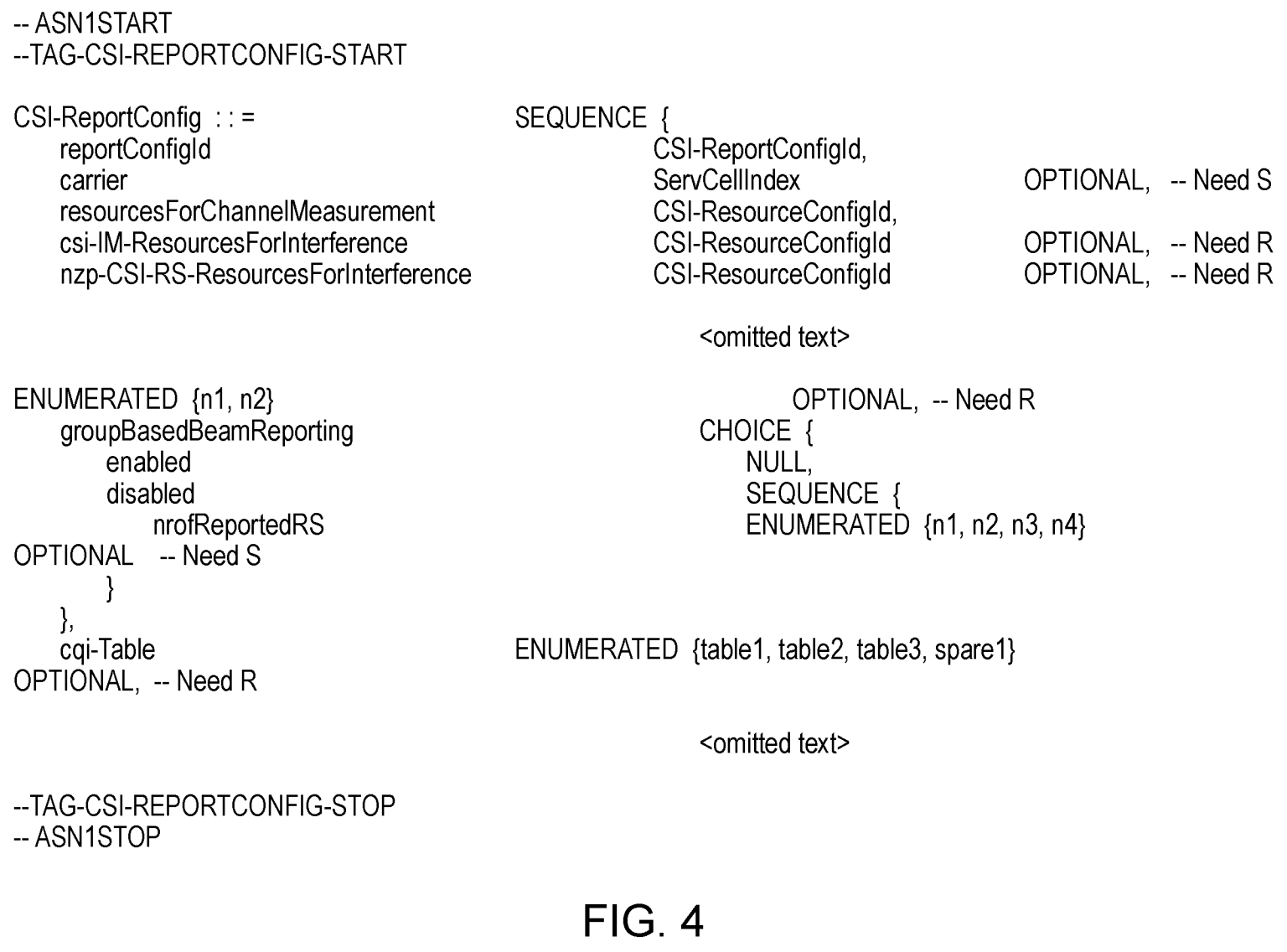

```
-- ASN1START
-- TAG-CSI-REPORTCONFIG-START

CSI-ReportConfig ::=             SEQUENCE {
    reportConfigId                  CSI-ReportConfigId,
    carrier                         ServCellIndex                  OPTIONAL,   -- Need S
    resourcesForChannelMeasurement  CSI-ResourceConfigId,
    csi-IM-ResourcesForInterference CSI-ResourceConfigId           OPTIONAL,   -- Need R
    nzp-CSI-RS-ResourcesForInterference CSI-ResourceConfigId       OPTIONAL,   -- Need R <omitted text> groupBasedBeamReporting         CHOICE {
        enabled                         NULL,
        disabled                        SEQUENCE {
            nrofReportedRS                  ENUMERATED {n1, n2, n3, n4}
    OPTIONAL    -- Need S
        }
    },
    cqi-Table                       ENUMERATED {table1, table2, table3, spare1}
    OPTIONAL,   -- Need R <omitted text>

-- TAG-CSI-REPORTCONFIG-STOP
-- ASN1STOP
```

ENUMERATED {n1, n2}

OPTIONAL,  -- Need R

Figure 8:
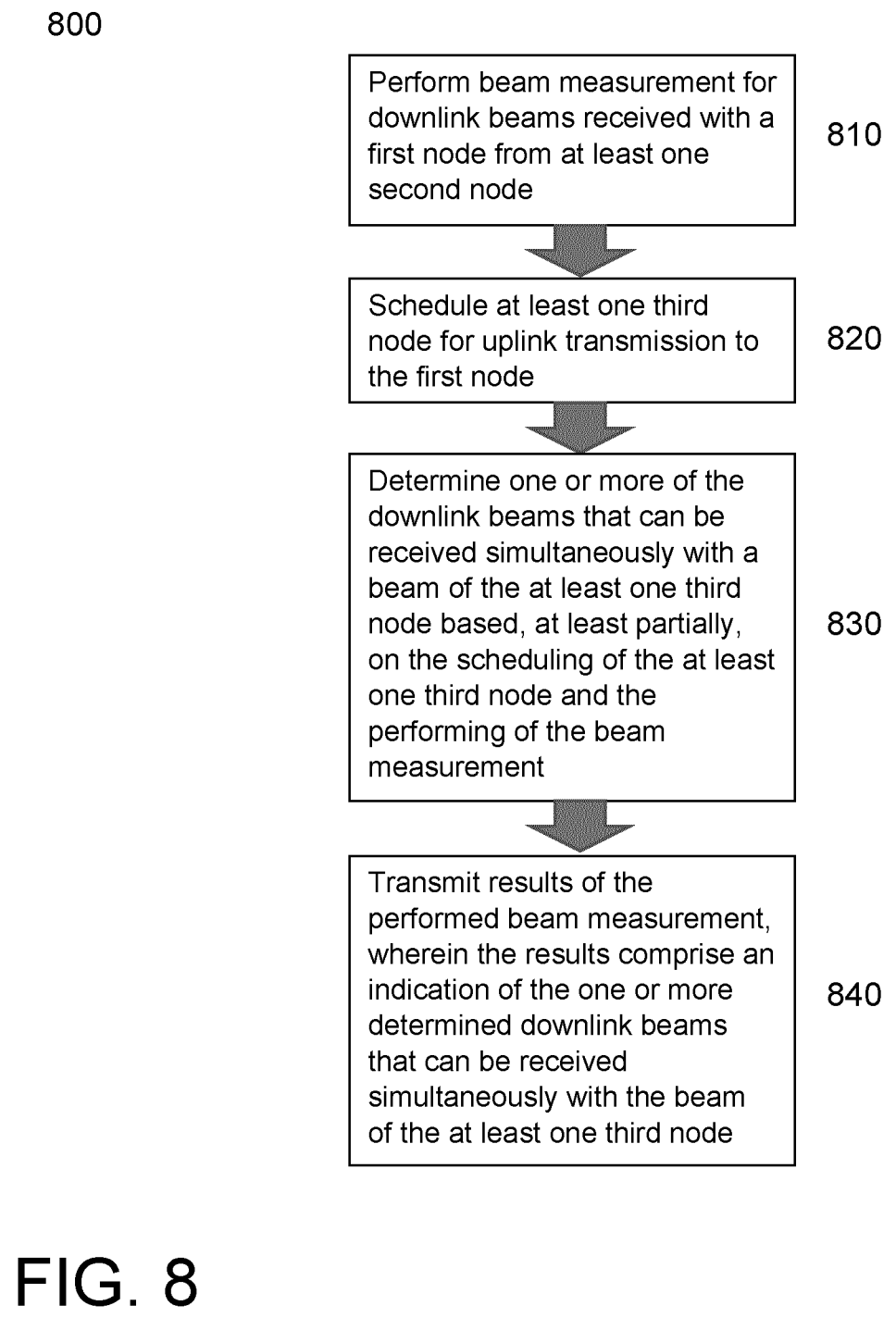

```
┌─────────────────────────────┐
│ Perform beam measurement for│
│ downlink beams received with a│   810
│ first node from at least one│
│ second node                 │
└─────────────────────────────┘
              │
              ▼
┌─────────────────────────────┐
│ Schedule at least one third │
│ node for uplink transmission to│   820
│ the first node              │
└─────────────────────────────┘
              │
              ▼
┌─────────────────────────────┐
│ Determine one or more of the│
│ downlink beams that can be  │
│ received simultaneously with a│
│ beam of the at least one third│
│ node based, at least partially,│   830
│ on the scheduling of the at least│
│ one third node and the      │
│ performing of the beam      │
│ measurement                 │
└─────────────────────────────┘
              │
              ▼
┌─────────────────────────────┐
│ Transmit results of the     │
│ performed beam measurement, │
│ wherein the results comprise an│
│ indication of the one or more│   840
│ determined downlink beams   │
│ that can be received        │
│ simultaneously with the beam│
│ of the at least one third node│
└─────────────────────────────┘
```

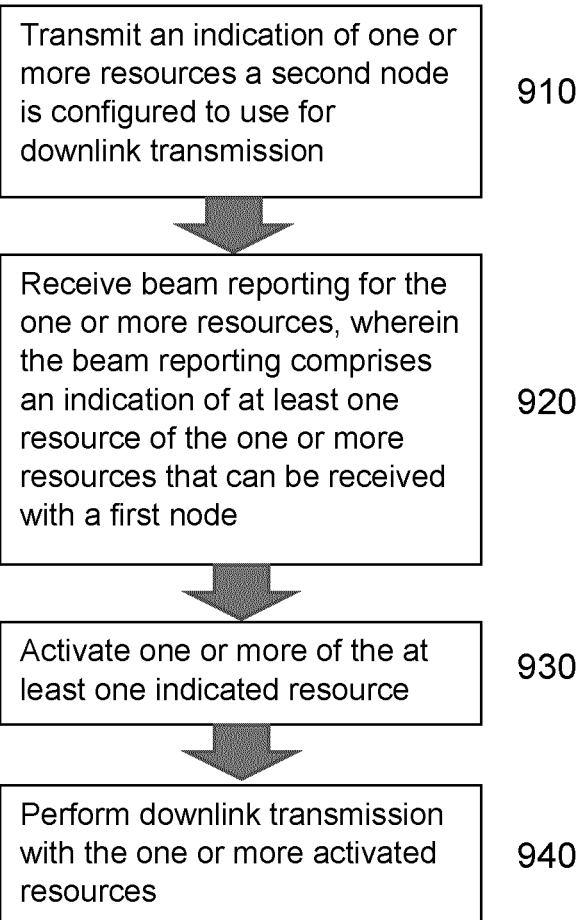

Transmit an indication of one or more resources a second node is configured to use for downlink transmission          910

Receive beam reporting for the one or more resources, wherein the beam reporting comprises an indication of at least one resource of the one or more resources that can be received with a first node          920

Activate one or more of the at least one indicated resource          930

Perform downlink transmission with the one or more activated resources          940

FIG. 9

BEAM REPORTING ENHANCEMENT FOR SIMULTANEOUS IAB RECEPTION

RELATED APPLICATION

This application was originally filed as PCT Application No. PCT/EP2021/078000, filed on Oct. 11, 2021, which claims priority from U.S. Provisional Application No. 63/094,491, filed on Oct. 21, 2020, each of which is incorporated herein by reference in its entirety.

BACKGROUND

Technical Field

The example and non-limiting embodiments relate generally to communications and, more particularly, to facilitating use of backhaul links in a NR/5G network.

Brief Description of Prior Developments

It is known, for a gNB in NR/5G comprising a centralized unit and a distributed unit, to use a backhaul between gNBs/portions of a gNB to relay information between a user equipment and a network.

BRIEF DESCRIPTION OF THE DRAWINGS

The foregoing aspects and other features are explained in the following description, taken in connection with the accompanying drawings, wherein:

FIG. 4 is a diagram illustrating features as described herein;

FIG. 8 is a flowchart illustrating steps as described herein; and

FIG. 9 is a flowchart illustrating steps as described herein.

DETAILED DESCRIPTION OF EMBODIMENTS

Figure 1:
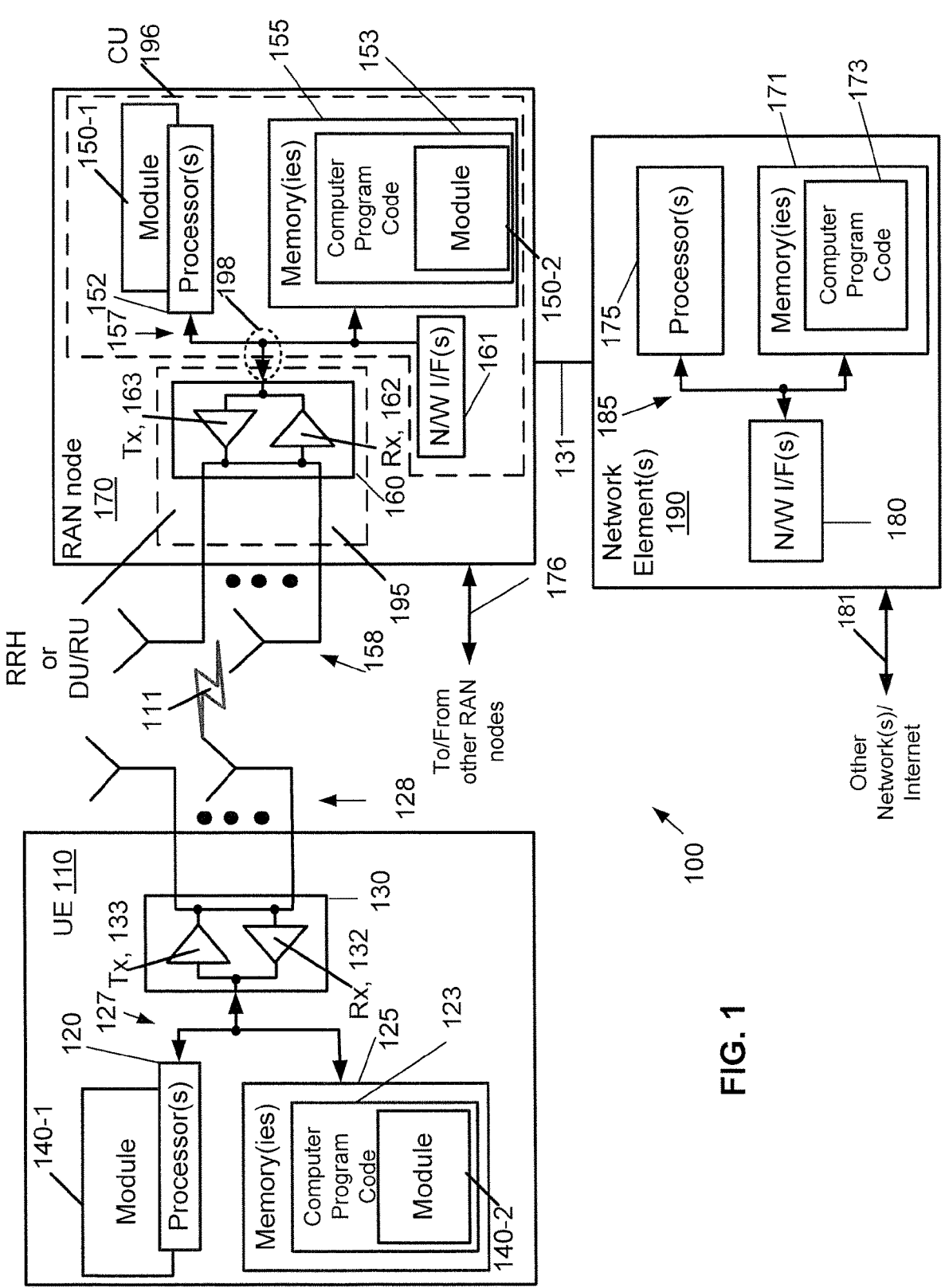
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
AMF access and mobility management function
BH backhaul
CLI cross-link interference
CRI CSI-RS (channel state information reference signal) Resource Indicator
CSI channel state information
CSI-RS channel state information reference signal
CU centralized unit
DC dual connectivity DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDM frequency division multiplexing
feMIMO further enhanced multiple input multiple output
FFS for future study
gNB (or gNodeB) base station for 5G/NR, i.e., a node providing NR user plane and control plane protocol terminations towards the UE, and connected via the NG interface to the 5GC
I/F interface
IAB integrated access and backhaul, or integrated access backhauling
L1 layer 1
LTE long term evolution
MAC medium access control
MIMO multiple input multiple output
MME mobility management entity
MT mobile termination
multi-TRP multiple transmission and reception points
ng or NG new generation
ng-eNB or NG-eNB new generation eNB
NR new radio
N/W or NW network
NZP non-zero power
PBCH physical broadcast channel
PDCP packet data convergence protocol
PHY physical layer
RAN radio access network
RF radio frequency
RLC radio link control
RS reference signal
RSRP reference signal received power
RRH remote radio head
RRC radio resource control
RU radio unit
Rx receiver
SDAP service data adaptation protocol
SDM spatial division multiplexing
SGW serving gateway
SMF session management function
SS secondary synchronization signal
SSBRI SS/PBCH (secondary synchronization signal/ physical broadcast channel) Resource Block Indicator
TCI transmission configuration indicator
TDM time division multiplexing
TRP transmission and reception point, e.g. relay node
Tx transmitter
UE user equipment (e.g., a wireless, typically mobile device)
UPF user plane function
WI work item Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a centralized unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a centralized unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
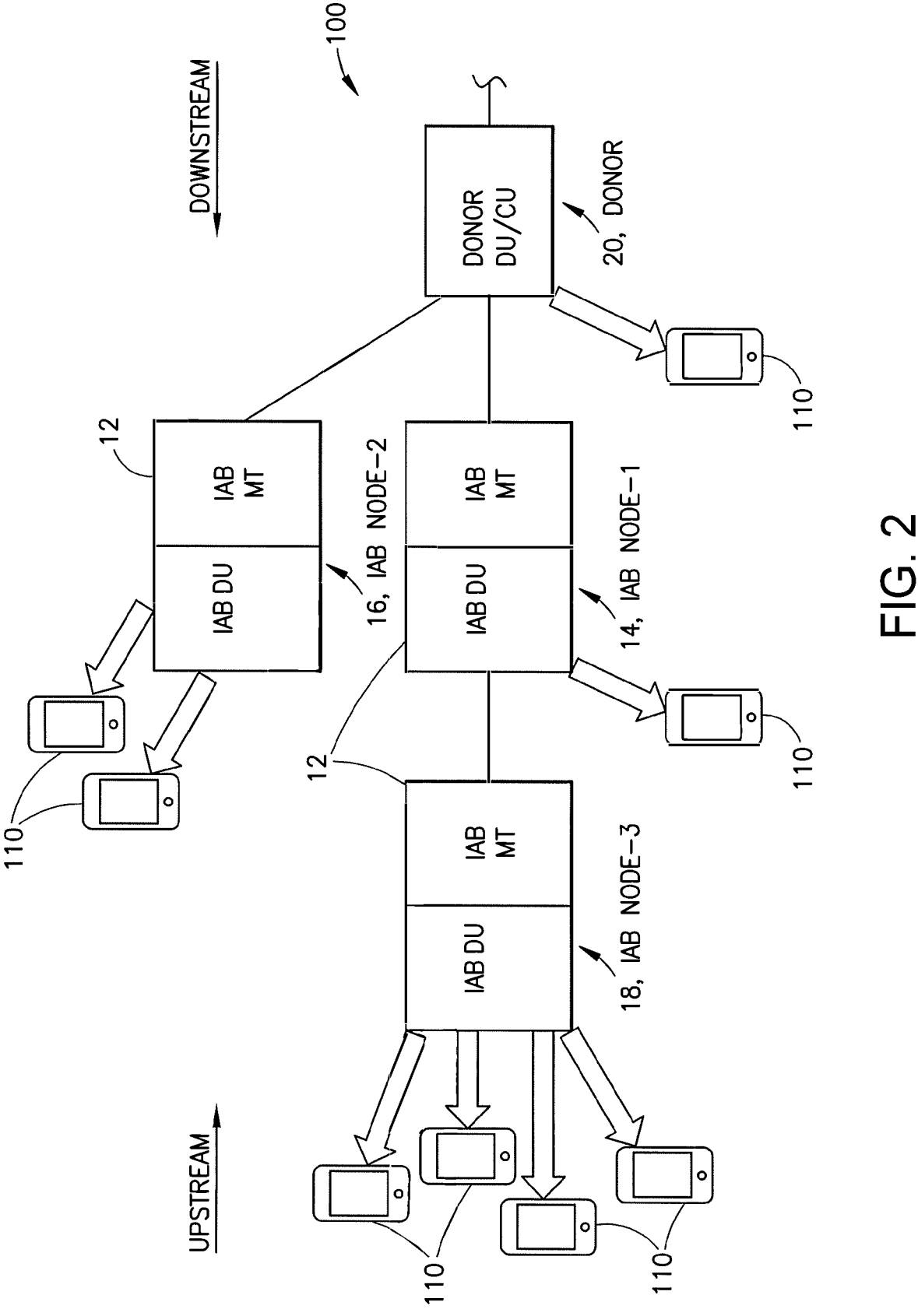
FIG. 2 is a schematic diagram illustrating an example of various devices in a network.

Referring to FIG. 2, a schematic diagram illustrating an example of various devices in a network 100 is shown. The network 100 in this example supports a multi-hop self-backhaul whereby 5G may be used to transport packets between Integrated Access and Backhaul (IAB) nodes (12) and a Donor (20), such as with a fiber connection to the Next Generation Core (NG-Core or NGC) or Evolved Packet Core (EPC) for example. In this example three (3) IAB nodes 12 are shown: IAB Node-1, 14; IAB Node-2, 16; and IAB Node-3, 18. However, more or fewer nodes 12 may be provided, and their topology may vary. FIG. 2 also shows a Donor 20 and various User Equipments (UEs) 110. Each IAB node consists, logically, of a Mobile Termination (MT) (e.g. IAB MT) that communicates with upstream nodes, and a RAN component, such as a Distributed Unit (DU) (e.g. IAB DU), that communicates with downstream IAB nodes or subscriber UEs 110. In other words, the MT part of an IAB node may be used to communicate with a parent node, and the DU part of an IAB node may be used to communicate with a child node or UE.

Features as described herein generally relate to scheduling of integrated access and backhaul (IAB) nodes for simultaneous reception with/using child and parent links. In NR/5G, a gNB may comprise a split architecture in which a centralized unit (CU) and a distributed unit (DU) each perform a subset of the functionalities of the gNB. A mobile termination (MT) of an IAB node may communicate with a parent node, such as IAB donor, illustrated in FIG. 2 at 20. The IAB donor may comprise the centralized unit of the gNB and may also comprise the distributed unit. A distributed unit (DU) of an IAB node may communicate with a child node or a user equipment. For example, in the example of FIG. 2, DU of IAB Node-1, 14, may be configured to communicate with IAB Node-3, 18. Accordingly, in the example of FIG. 2, IAB donor 20 may transmit a packet over a backhaul to IAB Node-1, 14, which may forward the packet over a backhaul to IAB Node-3, 18, which may transmit the packet to a UE 110. This process may be considered a form of relaying. However, when an IAB node is configured to perform simultaneous reception with both the MT and the DU, some packets may not be received due to frequency overlap between MT reception and DU reception, i.e. the same carrier frequencies may be used by both the MT and DU. Example embodiments of the present disclosure may relate to uplink reporting by the IAB MT that may facilitate simultaneous reception with MT and DU. Example embodiments of the present disclosure may relate to scenarios in which an IAB MT has a backhaul link with a single parent, or backhaul links with multiple parents.

In intra-frequency dual connectivity (DC) scenarios of/using unpaired spectrum FR2, an integrated access backhaul mobile termination (IAB MT) may be scheduled to perform reception with multiple beams, each from a different parent, i.e. IAB node or IAB donor. As IAB MT reception (RX) beamforming may be implemented with hybrid beamforming, it may be that only one beam per panel (IAB MT panel) can be used for receiving at any time. But, if a single panel receives two beams from spatially separated parents, it may be understood that the transmission of only one of the two beams may be successfully received Without a clear understanding of the IAB-MT's capability of receiving two different beams (each from a different parent) with different panels, the transmission from one parent may fail.

In an example embodiment of the present disclosure, intra-frequency DC scenarios may rely on enhanced beam reporting, such that beam pairs that can be simultaneously received at the IAB MT may be reported towards the network/parents.

RAN1 agreed on spatial division multiplexing/frequency division multiplexing (SDM/FDM) operation (Case #A and Case #B), and it is expected to consider these multiplexing modes with more details in the future, potentially with respect to: Case #6 and #7 timing modes; extensions for downlink/uplink (DL/UL) power control; cross-link interference (CLI); and/or interference measurements of back-haul (BH) links, as needed, to support simultaneous opera-tion (transmission and/or reception). Case #A and #B are mentioned in the below agreement [Session notes for 8.10 (Enhancements to Integrated Access and Backhaul), 3GPP TSG RAN WG1 Meeting #102-e]:

" . . . Agreement

Based on the WID, the following multiplexing cases are in scope for potential support in Rel-17:

Multiplexing Case A: Simultaneous MT-Tx/DU-Tx

Multiplexing Case B: Simultaneous MT-Rx/DU-Rx

Multiplexing Case C: Simultaneous MT-Rx/DU-Tx

Multiplexing Case D: Simultaneous MT-Tx/DU-Rx

Further study for Case A and Case B at least the following scenarios:

Single or multi-panel IAB nodes operating in unpaired spectrum (FR1 and FR2 bands)

Further study for Case C and Case D at least for the following scenarios:

Multi-panel IAB nodes operating in unpaired spectrum (FR1 and FR2 bands)

FFS: Required level of specification impact to support the different cases. Any additional specification support in Rel-17 should be conditioned on feasibility from an interference and reliability perspective on a per-link and network basis . . . "

In this agreement, it may be noted that simultaneous reception at the integrated access and backhaul (IAB) node may require specification for the following cases: IAB mobile termination (MT) and IAB distributed unit (DU) supporting Case #B (i.e. simultaneous mobile termination reception and distributed unit reception), where IAB MT connects only to a single parent; IAB MT and IAB DU supporting Case #B, where IAB MT connects to multiple parents (when it is supported in intra-frequency DC sce-nario); IAB MT and IAB DU supporting time division multiplexing (TDM), where IAB MT connects to multiple parents (when it is supported by intra-frequency DC sce-nario). The last case may also be relevant for UEs connect-ing to multiple parents (e.g. multiple transmission and reception point (Multi-TRP) beam reporting).

In Rel-15, beam reporting is supported, and TS 38.214 ["NR; Physical layer procedures for data", 3GPP] captures the following:

" . . . If the UE is configured with a CSI-ReportConfig with the higher layer parameter reportQuantity set to 'cri-RSRP' or 'ssb-Index-RSRP', if the UE is configured with the higher layer parameter groupBasedBeamReporting set to 'disabled', the UE is not required to update measurements for more than 64 CSI-RS and/or SSB resources, and the UE shall report in a single report nrofReportedRS (higher layer con-figured) different CRI or SSBRI for each report setting.

if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive fil-ters . . . "

TS 38.331 ["Radio Resource Control (RRC); Protocol specification", 3GPP] presents CSI-ReportConfig informa-tion element illustrated at FIG. 4.

RAN1 feMIMO discussions on beam reporting enhance-ments have captured the following in the FL summary of R1-2007294, "Summary on email discussion on beam man-agement for simultaneous multi-TRP transmission with mul-tiple Rx panels", Moderator (CATT):

" . . . For L1-RSRP, consider measurement/reporting enhancement to facilitate inter-TRP beam pairing Option-1: Group-based reporting, e.g., beam restriction to facilitate inter-TRP pairing.

Option-2: Non-group-based reporting . . .

. . . Evaluate and study at least but not limited to the following issues for multi-beam enhancement Issue 1: Consideration of inter-beam interference Issue 2: For group-based reporting, increased number of groups and/or beams per group Issue 3: UE Rx panel related beam measurement/report NOTE: "UE panel" is used for discussion purpose only . . .

. . . Example proposals for option1/2 of proposal 1-1. Note these examples are not exhaustive or exclusive.

Option-1:

Example 1: introduce higher-layer configured indices (labelled SSI, for discussion purpose only) configured to CMR resources, where UE is requested to report beams with the same or different SSIs within a reported group Example 2: One CSI resource setting can be configured with multiple CSI-RS resource sets (each of which corresponds to a TRP transparently), with a restriction/ requirement for group based report. E.g. —1 the maxi-mum number of CSI-RS in a set to be reported in a group, e.g., 1, 2 or 4. E.g. —2, each set should be with at least one CSI-RS resource to be reported, if multiple CSI-RS resources reported in a group.

Option-2

Example 1: Two non-group based reporting settings are configured for a UE to report L1-RSRP measurement results, with reporting setting 1 containing resources from TRP1, and another reporting setting 2 containing resources from the second TRP2. The two reporting settings are configured that UE knows the reported beams in the two reports could be received simultane-ously Example 2: Two non-group based reporting settings are configured for a UE to report L1-RSRP measurement results, with reporting setting 1 containing resources from TRP1, and another reporting setting 2 containing resources from the second TRP2. An explicit ID is associated with each reported resources. For the reported resources associated with different IDs, they can be received simultaneously by the UE. For the reported resources associated with the same ID, they cannot be received simultaneously by the UE . . . "

A UE may have the option to report beam pairs that it can receive simultaneously. In group-based beam reporting, the beam pairs may be selected from a single transmission and reception point (TRP) or multiple TRPs, but Rel-17 feMIMO (further enhanced multiple in multiple out) dis-cussions are ongoing to consider pairs of beams from different TRPs. Assuming MT will support Rel-16/17 UE MIMO capabilities, these beam reporting features may, to some extent, help handling the problem with IAB nodes that simultaneous transmission may result in one or more trans-missions to not be successfully received. However, this IAB problem may require a different solution than that which may be implied by UE group-based beam reporting or non-group based beam reporting, as supporting multiplexing case #B (i.e. simultaneous MT-Rx/DU-Rx) together with intra-frequency DC may additionally require alignment of the simultaneous reception of MT and DU beams. MT beam availability may change depending on which child node or UE is scheduled by the IAB DU at a given instant. A solution for this problem may also go beyond the intra-frequency DC scenario and be generally applicable for case #B operation, as simultaneous reception of MT and DU beam may be supported in the future.

The example embodiments of the present disclosure may be applicable in both the single parent scenario and the multi-parent scenario.

Figure 3:
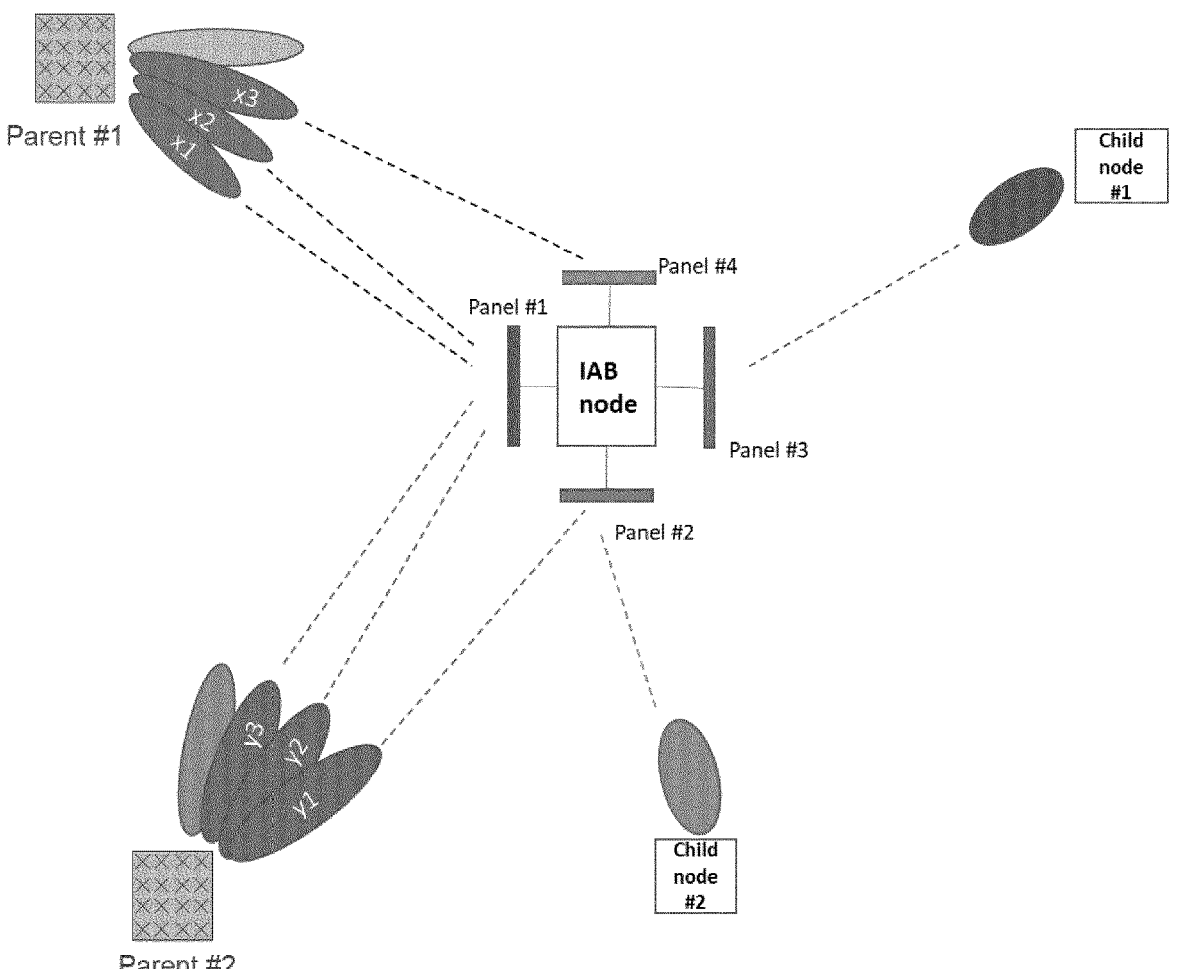
FIG. 3 is a diagram illustrating features as described herein.

Referring now to FIG. 3, illustrated is an example scenario of IAB operation in spatial division multiplexing (SDM) Case #B (i.e. simultaneous MT-Rx/DU-Rx) and intra-frequency dual connectivity DC. In the example of FIG. 3, the IAB node consists of four panels (panel #1, panel #2, panel #3, panel #4), each directed towards a different direction. However, it should be understood that an IAB node may comprise more or fewer panels arranged in a similar or different configuration. In the example of FIG. 3, the IAB node may use either one fixed panel (covers only one direction) or a few panels (covers more directions) to serve the child nodes/UEs (e.g. child node #1, child node #2) within its vicinity and may also maintain a connection towards/with parents (e.g. parent #1, parent #2) using the same set of panels.

In FIG. 3, assuming that group-based beam reporting is enhanced according to an example embodiment of the present disclosure, the intra-frequency DC support may use one or more of the following beam pairs: (x1, y1), (x2, y1), (x3, y1), (x3, y2), (x3, y3). These beam pairs may be viable because they enable parent #1 and parent #2 beams to be received with different panels. In the example of FIG. 3, Parent #1 transmits beams x1 and x2 towards panel #1, and beam x3 towards panel #4. In the example of FIG. 3, Parent #2 transmits beam y1 towards panel #2, and beams y2 and y3 towards panel #1. Accordingly, beam x1 of Parent #1 and beam y1 of Parent #2 may be received simultaneously with different panels; beam x2 of Parent #1 and beam y1 of Parent #2 may be received simultaneously with different panels; beam x3 of Parent #1 and beam y1 of Parent #2 may be received simultaneously with different panels; beam x3 of Parent #1 and beam y2 of Parent #2 may be received simultaneously with different panels; and beam x3 of Parent #1 and beam y3 of Parent #2 may be received simultaneously with different panels. In contrast, beam x1 of Parent #1 and beam y2 of Parent #2 may not be received simultaneously, as they are both directed to the same panel of the IAB node, panel #1. It should be noted that there may be more or fewer parents, that the parents may transmit more or fewer beams towards the IAB node, and that different combinations of beams directed to each panel may be possible; FIG. 3 is intended to illustrate an example, not limit the scope of the present disclosure.

It should be noted that the IAB node of FIG. 3 may be understood to comprise MT and DU. If Case #B operation (i.e. simultaneous MT-Rx/DU-Rx) is assumed at the IAB MT and IAB DU of the IAB node, the intra-frequency DC support may not be able to use all beam pairs reported above, as a panel used to serve a child node may not be used simultaneously for intra-frequency DC support. Also, the combination of beam pairs useable for intra-frequency DC support may change as the child node that IAB DU is scheduling in UL changes. For example, when child node #2 is served by the IAB node, panel #2 may not be used for beam y1 transmitted by/received from parent #1. However, beam y1 may be available for intra-frequency DC support when child node #1 is scheduled by the IAB DU and child node #2 is not, as child node #1 transmits towards panel #3 of IAB node in the example of FIG. 3, towards which no parent is illustrated to transmit a beam.

It should also be noted that, in a single parent scenario, there may be restrictions with beam use. For example, if parent node #1 is removed from FIG. 3 so that the IAB node is served only by the Parent node #2, there may be the restriction that Case #B operation does not allow simultaneous reception by IAB node MT through beam y1 and IAB node DU reception from child node #2.

Example embodiments of the present disclosure may provide a more efficient framework for beam reporting, which may solve the aforementioned concerns that simultaneous reception during intra-frequency DC and/or Case #B operation in general may result in an IAB node failing to receive a beam.

In an example embodiment, beam reporting may be enhanced for IAB deployments such that the network gets more accurate feedback information to select the beams at parent node(s) for transmission so as to allow multiplexing Case #B (i.e. simultaneous MT-Rx/DU-Rx) to be enabled at the IAB node.

In an example embodiment, when the IAB MT is supported by intra-frequency dual connectivity (or single parent scenario) and IAB DU schedules UL transmission in the same resources (i.e. the IAB DU expects to receive a transmission from a user equipment or child node in the same resources), the beam reporting from the IAB node to the parent/network may carry additional information representing the multiplexing mode, restrictions applied when supporting a multiplexing mode, and/or any other details that may allow the network/parent to understand/determine changes of beam pairs (beams in single parent scenario) that may be received simultaneously at the IAB MT while the IAB DU is scheduled to receive transmission from a user equipment or child node.

In an example embodiment, the additional information included in the beam reporting from the IAB node may be used by the network to decide/restrict the beams used for DL transmission towards IAB MT, while enabling IAB DU to provide the possibility to schedule the UL transmission of a child node(s).

In an example embodiment, when the IAB node operates in time division multiplexing (TDM) mode, where IAB MT and DU use different time-domain allocations, the beam reporting may consider/include an indication of: a multiplexing mode; an indication of a lack of beam/panel restrictions; indication(s) with beam pairs based on beam measurements; beam pair(s) that are allowable; and/or reference beam pair(s). The IAB MT may report, as additional information included in the beam reporting, a multiplexing mode (TDM), an indication that there are no restrictions of use of beams/panels, and/or any other indication together with the beam pairs (e.g. using group-based beam reporting, or beams single parent scenario) based on beam measurements made at/with the IAB MT. In one variant, the reported beam pairs (or beams) may be used as the reference beam pairs (or beams) for later updates. The IAB MT may be configured to report, as additional information included in the beam reporting, more than one beam pair (sufficient combinations) such that the parents have more than one beam pair that can be applied when supporting intra-frequency DC connectivity with any multiplexing mode. The reported beam pairs (or beams) may also be considered as reference beam pair(s) that the IAB MT supports. The reference beam pairs (or beams) may be fixed or updated with time depending on further measurements and reporting made by/with the IAB MT.

In an example embodiment, when the IAB node operates in Case #B (i.e. simultaneous MT-Rx/DU-Rx), where IAB MT and DU may operate in simultaneous reception, the beam reporting may consider/include an indication of: a multiplexing mode; an indication of beam/panel restrictions; indication(s) without beam pairs based on beam measurements; and/or change of beam pairs. In one variant, the IAB MT may report, as additional information included in the beam reporting, a multiplexing mode (SDM), an indication that there are certain restrictions of use of beams/panels, and/or any other indication, with or without beam pairs (e.g. using group-based beam reporting) (beams in single parent scenario), based on beam measurements made at/with the IAB MT. When the IAB MT reports an indication that there are certain restrictions of use of beams/panels, or any other indication, the IAB MT may determine the changes/restrictions on beam pairs (beams) based on the use of IAB DU panels to serve one or more child node(s). In another reporting variant, with or without exact beam measurement, the IAB MT may report, as additional information included in the beam reporting, the changes of beam pairs (beams) compared to previously reported beam pair(s)/beam(s) or compared to reference beam pair(s)/reference beam(s) when using TDM mode.

In an example embodiment, when the IAB node operates in Case #B (i.e. simultaneous MT-Rx/DU-Rx) and is serving a different child node than previously, the changes of beam pairs (beams) may be reported again to reflect the changes that have occurred due to the different child node (applying the earlier method).

In an example embodiment, for the intra-frequency DC scenario, the above beam reporting enhancement (of including additional information that may enable a network to determine changes to beam pairs that may be received simultaneously at the IAB MT) may use a group-based beam measurement and reporting framework, where pairs of beams that can be received simultaneously may be reported by the IAB MT using one or more variants of the above described additional information.

In an example embodiment, in a single parent scenario, the above beam reporting enhancement (of including additional information that may enable a network to determine changes to beam pairs that may be received simultaneously at the IAB MT) may use a legacy beam measurement and reporting framework, where pairs of beams that can be received simultaneously may be reported by the IAB MT using one or more variants of the above described additional information.

Figure 5:
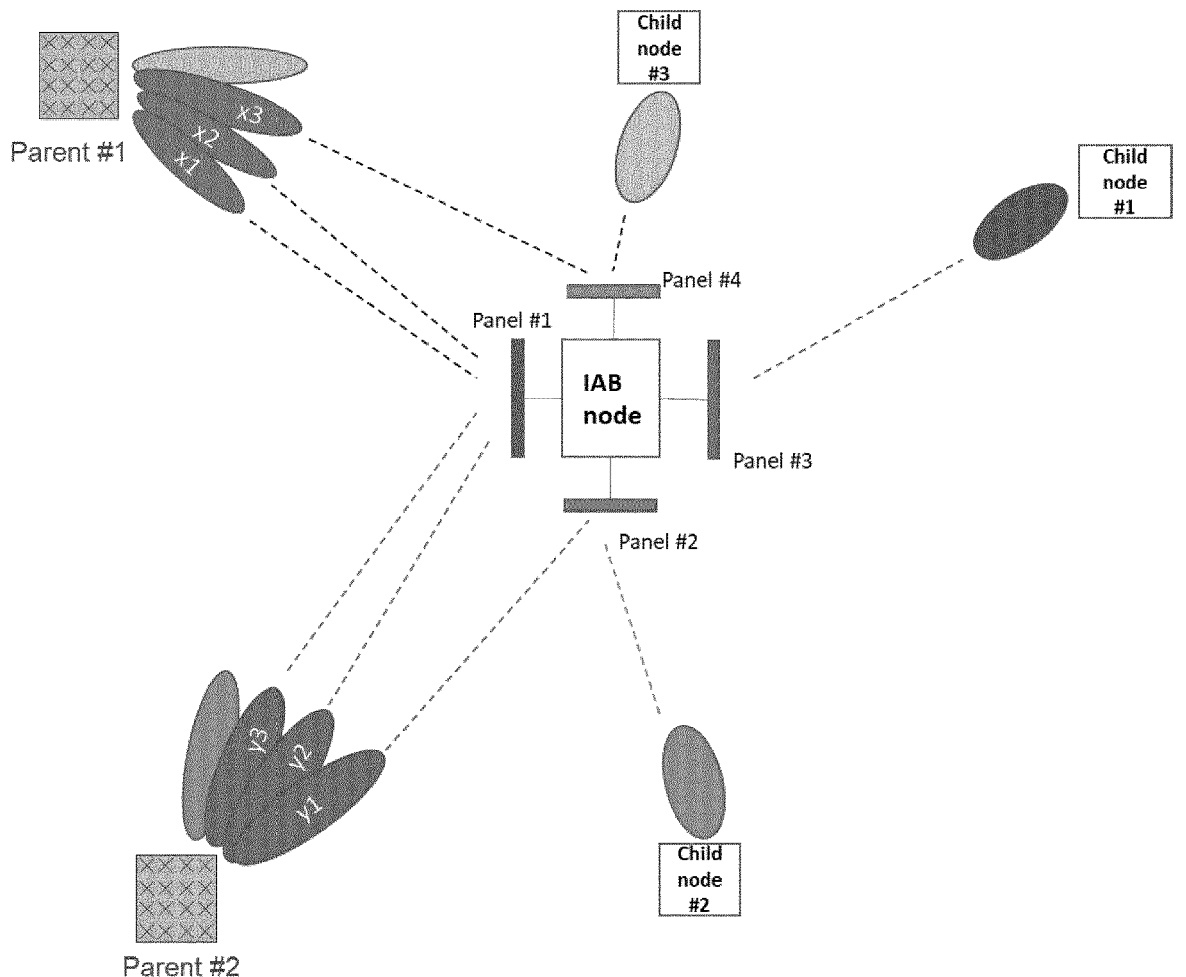
FIG. 5 is a diagram illustrating features as described herein.

Referring now to FIG. 5, illustrated is an example scenario for Case #B (i.e. simultaneous MT-Rx/DU-Rx) and intra-frequency DC operation. In the example, an IAB node is illustrated as having four panels, Panel #1, Panel #2, Panel #3, and Panel #4. Parent #1 may be configured to transmit to panels #1 and #4 of the IAB node. Parent #2 may be configured to transmit to panels #1 and #2 of the IAB node. Child node #1 may be configured to transmit to Panel #3. Child node #2 may be configured to transmit to Panel #2. Child node #3 may be configured to transmit to Panel #4. Stated in an alternative manner, the IAB node may be configured to receive transmissions from: Parent #1 and Parent #2 with panel #1; Parent #2 and Child node #2 with panel #2; Child node #1 with panel #3; and Parent #1 and Child node #3 with panel #4.

Using as an example FIG. 5, following is a description of beam pairs that may be reported by the IAB MT to parent nodes/the network. If the IAB node is operating in the TDM mode, beam measurements and reporting may indicate one or more of the following reference beam pairs: (x1, y1), (x2, y1), (x3, y1), (x3, y2), (x3, y3). The beam pairs that may be reported to parent(s)/the network may be determined based, at least partially, on the child node(s) from which the IAB node is scheduled to receive uplink transmission.

Based on an IAB scheduling decision of SDM operation with different child nodes, some reference pairs may not be suitable. In the example of FIG. 5, when no child nodes are scheduled by IAB-DU, the reference pairs may include (x1, y1), (x2, y1), (x3, y1), (x3, y2), and (x3, y3). In one example based on the scenario illustrated at FIG. 5, when child node #1 is scheduled by IAB-DU, the reference pairs may include (x1, y1), (x2, y1), (x3, y1), (x3, y2), (x3, y3). In this example, scheduling of child node #1 might not result in a change in the reference pairs. The IAB-MT may or may not update the parent node(s) when child node scheduling does not result in a change in the reference pairs. However, other scheduling by the IAB-DU may result in an update to the reference pairs.

In one example based on the scenario illustrated at FIG. 5, when child node #2 is scheduled by IAB-DU, the reference pairs may be updated to include (x3, y2) and (x3, y3). In other words, beam pairs (x1, y1), (x2, y1), and (x3, y1) may not be suitable when child node #2 is scheduled by IAB-DU.

In one example based on the scenario illustrated at FIG. 5, when child node #3 is scheduled by IAB-DU, the reference pairs may be updated to include (x1, y1) and (x2, y1). In other words, beam pairs (x3, y1), (x3, y2), and (x3, y3) may not be suitable when child node #3 is scheduled by IAB-DU.

In one example based on the scenario illustrated at FIG. 5, when both child nodes #2 and #3 are scheduled by IAB-DU, the reference pairs may updated to not include any beam pairs. In other words, beam pairs (x1, y1), (x2, y1), (x3, y1), (x3, y2), and (x3, y3) may not be suitable when child nodes #2 and #3 are scheduled by IAB-DU.

The foregoing examples consider the case in which the IAB node is connected to both parent #1 and #2 in the scenario illustrated at FIG. 5. However, it is possible that the IAB node is connected to only one of the parent nodes. For example, the IAB node may only be connected to parent #2. For serving child #2, the reference pair may be updated to only include beam pairs using parent #2 beams y2 and y3, as FIG. 5 illustrates that both parent #2 beam y1 and child node #2 beam are directed to panel #2. As these beams cannot be received simultaneously, the IAB node may include, in beam reporting, additional information indicating that the beam directed to panel #2, y1, may not be used in Case #B (i.e. simultaneous MT-Rx/DU-Rx) so as to enable reception at the IAB node from child node #2. Other combinations of scheduled reception from parent node(s) and child node(s) may be possible.

In the above examples based on the scenario illustrated at FIG. 5, measurement and reporting might not always be carried out such that all details should be reported. In an example embodiment, beam measurement may or may not be carried out when a child node is scheduled by the IAB-DU. In an example embodiment, reporting may or may not be carried out when a child node is scheduled by the IAB-DU. In the present disclosure, methods of optimizing feedback overhead are not discussed in detail, as such mechanisms are well known (e.g. bit maps).

When the IAB node is stationary, the beam pairs suitable for TDM might not change much in comparison to a mobility case. Accordingly, in an example embodiment, beam measurements and reporting might only be considered assuming TDM operation (i.e. infrequent updates), and frequent updates, depending on the panel use/child node scheduling, may report the changes to the reported beam pairs. As IAB nodes may therefore not waste effort on frequent beam measurement and reporting, we expect efficient simultaneous operation for intra-frequency DC and Case #B (i.e. simultaneous MT-Rx/DU-Rx) at the IAB node.

Figure 6:
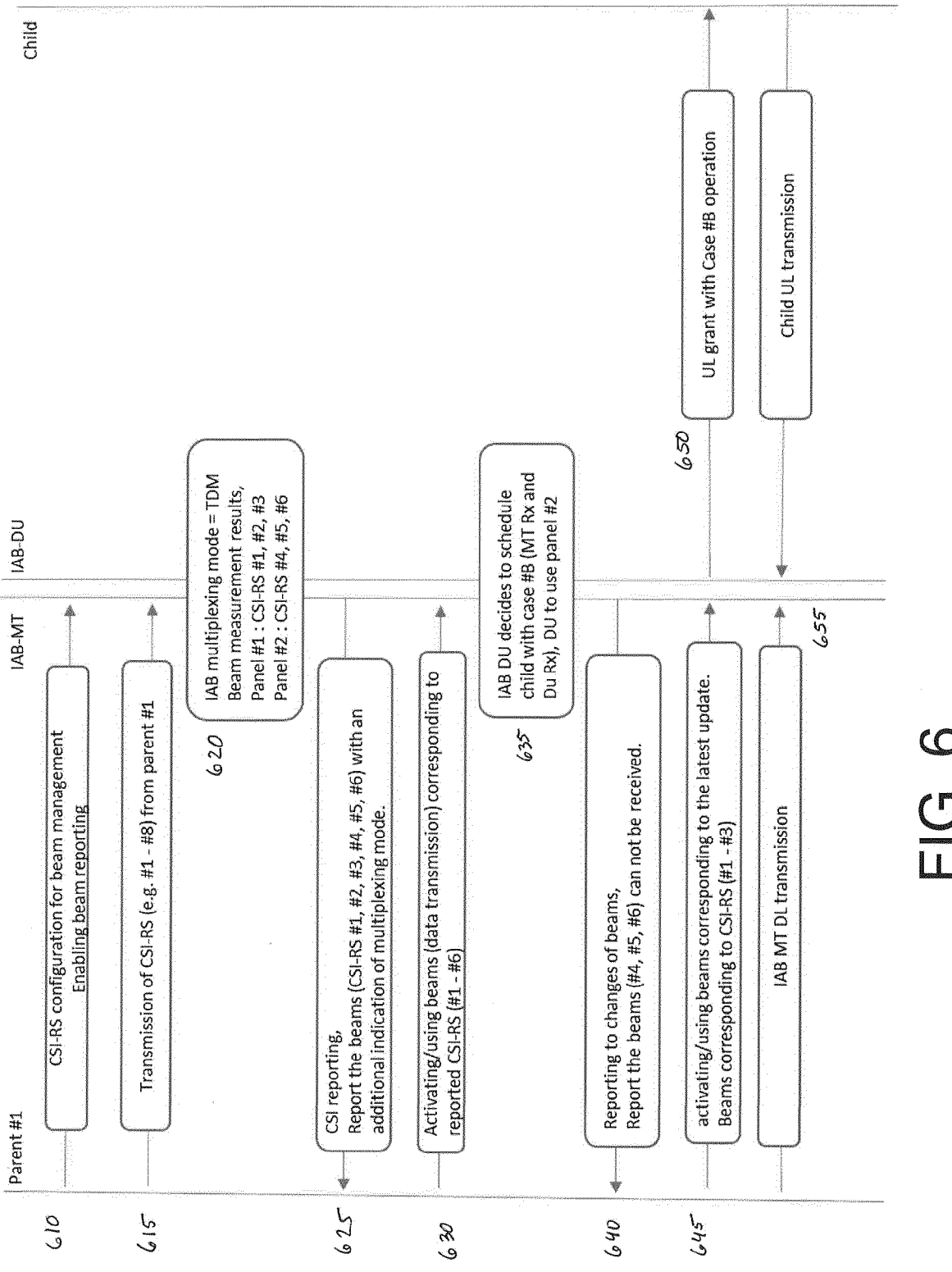
FIG. 6 is a diagram illustrating features as described herein.

Referring now to FIG. 6, illustrated is an example signaling diagram on enhanced beam reporting, according to example embodiments of the present disclosure, for SDM operation with a single parent node. It should be noted that, in this diagram, the IAB node is illustrated as an IAB-MT, which communicates with a parent node, and an IAB-DU, which communicates with a child node. In this example, only one parent node is linked to the IAB node (IAB-MT+ IAB-DU). An example in which more than one parent node is linked to the IAB node (IAB-MT+IAB-DU) is described below with reference to FIG. 7.

Referring now to FIG. 6, at 610, the parent node #1 may configure the IAB-MT with channel state information (CSI) reporting configuration(s) that may enable beam reporting/ management. Within the CSI reporting configuration, associated reference signal(s) (RS) for the beam(s) may also be indicated. At 615, parent #1 may transmit associated channel state information reference signal(s) (CSI-RS) resources (with corresponding beams) to the IAB-MT. These CSI-RS may comprise non-zero power (NZP) CSI-RS. In the example of FIG. 6, the corresponding beams may comprise beams #1-#8 of parent #1.

At 620, the IAB-MT may perform beam measurement(s). For example, the IAB-MT may use two panels for CSI-RS measurements, assuming that simultaneously reception at the IAB MT and DU is not required. In the example of FIG. 6, the IAB node may determine that the IAB multiplexing mode is TDM. The IAB node may determine, based on beam measurement, that beams #1, #2, and #3 can be received with panel #1; that beams #4, #5, and #6 can be received with panel #2; and that beams #7 and #8 may not be received by any panel. At 625, the IAB-MT may report the beam reporting/measurement(s) (e.g. via CSI reporting) towards the network (i.e. parent #1) with the additional information as described above. For example, the additional information may include an indication of the TDM mode of the IAB node, and/or an indication of the acceptable beams #1-#6 for transmission from parent #1, etc.

At 630, parent #1 may activate/use the reported beam(s), which may be in the form of transmission configuration indicator (TCI) states associated with received CRI, to be used for control and/or data channel(s). In the example of FIG. 6, the parent #1 may activate one or more of beams #1-#6. While not illustrated in FIG. 6, parent #1 may perform data transmission to the IAB node using one or more of the beams reported with CSI-RS (i.e. beams #1-#6).

At 635, the IAB-DU may decide to schedule one or more child node(s) with the Case #B (i.e. simultaneous MT-Rx/ DU-Rx) SDM Rx multiplexing mode with IAB-MT, and may pre-determine the panel (beams) to be used to serve the child node. In the example of FIG. 6, the IAB-DU may decide to use panel #2 to enable reception from a child node. Accordingly, while the child node is scheduled, it may not be possible to simultaneously receive beams #4-#6 with panel #2 from parent #1. At 640, the IAB-MT may report beam reporting (e.g. via CSI reporting or any other reporting method) towards the network (i.e. parent #1) with the additional information. For example, the additional information may include restrictions applied for SDM operation as discussed above. For example, the additional information may include an indication that beams #4, #5, and #6 may not be received by the IAB-MT. The additional information may also include an indication that the multiplexing mode is SDM. In another example, the IAB-DU may include an indication that panel #2 will be used for reception from the child node.

At 645, parent #1 may activate/use only the reported beams indicated by the latest update, in the form of TCI states to be used, for control and data. Parent #1 may activate one or more of the beams that are not restricted, i.e. beams #1-#3. The IAB-MT may or may not get/receive an additional activation command for TCI states.

At 650, the IAB-DU may schedule UL transmission(s) such that IAB node can operate in Case #B mode (i.e. simultaneous MT-Rx/DU-Rx). The IAB-DU may transmit to the child node an UL grant with Case #B operation.

At 655, parent #1 may perform downlink transmission to the IAB-MT, and the child node may perform uplink transmission to the IAB-DU, simultaneously (i.e. during a same slot or time period). Each transmission may be received by the IAB node because the transmissions are non-overlapping, i.e. received with different panels of the IAB node.

Figure 7:
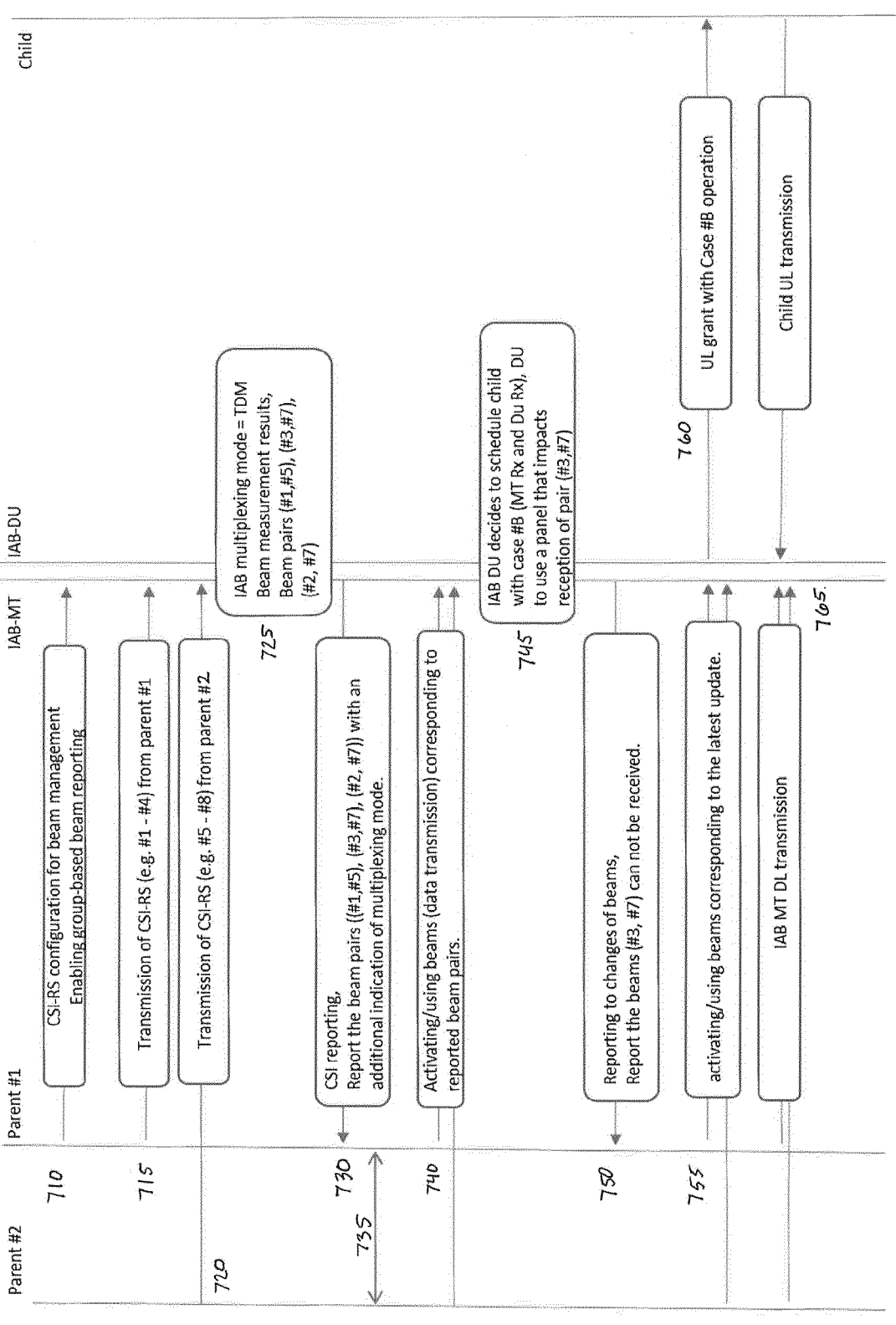
FIG. 7 is a diagram illustrating features as described herein.

Referring now to FIG. 7, illustrated is an example signaling diagram on enhanced beam reporting, according to example embodiments of the present disclosure, for SDM operation with intra-frequency DC. It should be noted that, in this diagram, the IAB node is illustrated as an IAB-MT, which communicates with a parent node, and an IAB-DU, which communicates with a child node. In this example, two parent nodes are linked to the IAB node (IAB-MT+IAB-DU), parent #1 and parent #2.

At 710, parent #1 may transmit a CSI-RS configuration for beam management to the IAB-MT. The configuration may enable group-based beam reporting. Within the CSI reporting configuration, associated reference signal(s) (RS) for the beam(s) may also be indicated. At 715, parent #1 may transmit associated channel state information reference signal(s) (CSI-RS) resources (with corresponding beams) to the IAB-MT. These CSI-RS may comprise non-zero power (NZP) CSI-RS. In the example of FIG. 7, the corresponding beams may comprise beams #1-#4 of parent #1. At 720 parent #2 may transmit associated CSI-RS to the IAB-MT. These CSI-RS may comprise non-zero power (NZP) CSI-RS. In the example of FIG. 7, the corresponding beams may comprise beams #5-#8 of parent #2.

At 725, the IAB-MT may perform beam measurement(s). In the example of FIG. 7, the IAB node may determine that the IAB multiplexing mode is TDM. The IAB node may determine, based on beam measurement, that beam pairs (#1, #5), (#3, #7), and (#2, #7) are appropriate (i.e. these beam pairs will allow for simultaneous reception of both parent #1 and parent #2). At 730, the IAB-MT may report the beam reporting/measurement(s) (e.g. via CSI reporting) towards the network (i.e. parent #1) with the additional information as described above. For example, the additional information may include an indication of the TDM mode of the IAB node, and/or an indication of the acceptable beam pairs ((#1, #5), (#3, #7), (#2, #7)) for transmission from parents #1 and #2, etc. Parent #1 may forward this beam reporting, including the additional information, to parent #2 at 735.

At 740, both parent #1 and parent #2 may activate/use the reported beam(s), which may be in the form of transmission configuration indicator (TCI) states associated with received CRI, to be used for control and/or data channel(s). In the example of FIG. 7, the parent #1 may activate one or more of beams #1, #2, and/or #3, and parent #2 may activate one or more of beams #5 and/or #7. While not illustrated in FIG. 7, parents #1 and/or #2 may perform data transmission to the IAB node using one or more of the beams reported with CSI-RS (i.e. beams #1-#3, #5, and/or #7).

At 745, the IAB-DU may decide to schedule one or more child node(s) with the Case #B (i.e. simultaneous MT-Rx/ DU-Rx) SDM Rx multiplexing mode with IAB-MT, and may pre-determine the panel(s)/beam(s) to be used to serve the child node. In the example of FIG. 7, the IAB-DU may decide to use a panel that impacts reception of pair (#3, #7) to enable reception from a child node. Accordingly, while the child node is scheduled, it may only be possible to receive transmission from the parent nodes with beam pairs (#1, #5) and (#2, #7). At 750, the IAB-MT may report beam reporting (e.g. via CSI reporting or any other reporting method) towards the network (i.e. parent #1) with the additional information. For example, the additional information may include restrictions applied for SDM operation, as discussed above. For example, the additional information may include an indication that the multiplexing mode is SDM. For example, the additional information may include an indication that transmissions with beam pair (#3, #7) may not be received by the IAB-MT. In another example, the IAB-MT may include an indication of a panel that will be used for reception from the child node. Parent #1 may forward this beam reporting, including the additional information, to parent #2. Alternatively, when there are additional information(s) available at the parent #1 about the restricted panel at the IAB node, and if beam #7 may still be used for transmission only using parent #2, parent #1 might not forward this beam reporting to parent #2, but parent #1 may restrain using beam #1.

At 755, both parent #1 and parent #2 may activate/use only the reported beams indicated by the latest update, in the form of TCI states to be used, for control and data. In the example of FIG. 7, the parent #1 may activate one or more of beams #1 and/or #2, and parent #2 may activate one or more of beams #5 and/or #7. The IAB-MT may or may not get/receive an additional activation command for TCI states.

At 760, the IAB-DU may schedule UL transmission(s) such that IAB node can operate in Case #B mode (i.e. simultaneous MT-Rx/DU-Rx). The IAB-DU may transmit to the child node an UL grant with Case #B operation.

At 765, parent #1 and parent #2 may perform downlink transmission to the IAB-MT, and the child node may perform uplink transmission to the IAB-DU, simultaneously (i.e. during a same slot or time period). Each transmission may be received by the IAB node because the transmissions are non-overlapping, i.e. received with different panels of the IAB node.

A technical effect of example embodiments of the present disclosure may be to ensure that a parent node will not transmit to an IAB node with a beam that may interfere with IAB node reception of a beam scheduled to be received from a child node.

FIG. 8 illustrates the potential steps of an example method 800. The example method 800 may include performing, with a first node, beam measurement for downlink beams received with the first node from at least one second node, 810; scheduling, with the first node, at least one third node for uplink transmission to the first node, 820; determining, with the first node, one or more of the downlink beams that can be received simultaneously with a beam of the at least one third node based, at least partially, on the scheduling of the at least one third node and the performing of the beam measurement, 830; and transmitting, with the first node, results of the performed beam measurement, wherein the results comprise an indication of the one or more determined downlink beams that can be received simultaneously with the beam of the at least one third node, 840.

FIG. 9 illustrates the potential steps of an example method 900. The example method 900 may include transmitting, to a first node, an indication of one or more resources a second node is configured to use for downlink transmission, 910; receiving, from the first node, beam reporting for the one or more resources, wherein the beam reporting comprises an indication of at least one resource of the one or more resources that can be received with the first node, 920; activating one or more of the at least one indicated resource, 930; and performing downlink transmission, to the first node, with the one or more activated resources, 940.

In accordance with one aspect, an example method may be provided comprising: performing, with a first node, beam measurement for downlink beams received with the first node from at least one second node; scheduling, with the first node, at least one third node for uplink transmission to the first node; determining, with the first node, one or more of the downlink beams that can be received simultaneously with a beam of the at least one third node based, at least partially, on the scheduling of the at least one third node and the performing of the beam measurement; and transmitting, with the first node, results of the performed beam measurement, wherein the results may comprise an indication of the one or more determined downlink beams that can be received simultaneously with the beam of the at least one third node.

The example method may further comprise: receiving, with the first node a configuration from the at least one second node, wherein the transmitting of the results of the performed beam management may be based, at least partially, on the received configuration.

The first node may comprise an integrated access and backhaul node divided into a mobile termination and a distributed unit, wherein the transmitting with the first node may be performed with the mobile termination, wherein the scheduling of the at least one third node may be performed with the distributed unit.

The example method may further comprise: simultaneously receiving, with the first node, a downlink beam from at least one of the at least one second node and an uplink beam from at least one of the at least one third node.

The determining of the one or more of the downlink beams that can be received simultaneously with the beam of the at least one third node may be based, at least partially, on a reception panel configuration of the first node.

The transmitting of the results of the performed beam measurement may further comprise transmitting at least one of: a multiplexing mode of the first node, one or more restrictions for the downlink beams, an indication that there is no restriction for the downlink beams, an indication of one or more reference beams, an indication of one or more reference beam pairs, a beam pair configured to support intra-frequency dual connectivity, or an indication based on the performing of the beam measurement.

The first node may be operating in one of: a time division multiplexing mode, or a spatial division multiplexing mode.

The example method may further comprise: transmitting, to the at least one third node, an uplink grant configuration, wherein the determining of the one or more of the downlink beams that can be received simultaneously with the beam of the at least one third node may be based, at least partially, on one or more panels of the first node indicated with the uplink grant configuration.

The downlink beams and the beam of the at least one third node may be associated with frequencies that overlap.

The first node may be configured to operate in an intra-frequency dual connectivity mode.

The transmitting of the results of the performed beam measurement may comprise transmitting the results to at least one of the at least one second node.

The at least one second node may comprise at least a first parent node and a second parent node, wherein the determining of the one or more downlink beams that can be received simultaneously with the beam of the at least one third node may comprise determining at least one downlink beam of the first parent node and at least one downlink beam of the second parent node that can be received simultaneously.

In accordance with one example embodiment, an apparatus may comprise: at least one processor; and at least one memory including computer program code; the at least one memory and the computer program code configured to, with the at least one processor, cause the apparatus to: perform beam measurement for downlink beams received with the apparatus from at least one second node; schedule at least one third node for uplink transmission to the apparatus; determine one or more of the downlink beams that can be received simultaneously with a beam of the at least one third node based, at least partially, on the scheduling of the at least one third node and the performing of the beam measurement; and transmit results of the performed beam measurement, wherein the results may comprise an indication of the one or more determined downlink beams that can be received simultaneously with the beam of the at least one third node.

The example apparatus may be further configured to: receive a configuration from the at least one second node, wherein the transmitting of the results of the performed beam management is based, at least partially, on the received configuration.

The example apparatus may be further configured to: simultaneously receive a downlink beam from at least one of the at least one second node and an uplink beam from at least one of the at least one third node.

Determining the one or more of the downlink beams that can be received simultaneously with the beam of the at least one third node may be based, at least partially, on a reception panel configuration of the apparatus.

Transmitting the results of the performed beam measurement may further comprise transmitting at least one of: a multiplexing mode of the apparatus one or more restrictions for the downlink beams, an indication that there is no restriction for the downlink beams, an indication of one or more reference beams, an indication of one or more reference beam pairs, a beam pair configured to support intra-frequency dual connectivity, or an indication based on the performing of the beam measurement.

The example apparatus may be further configured to: operate in one of: a time division multiplexing mode, or a spatial division multiplexing mode.

The example apparatus may be further configured to: transmit, to the at least one third node, an uplink grant configuration, wherein the determining of the one or more of the downlink beams that can be received simultaneously with the beam of the at least one third node may be based, at least partially, on one or more panels of the apparatus indicated with the uplink grant configuration.

The downlink beams and the beam of the at least one third node may be associated with frequencies that overlap.

The example apparatus may be further configured to: operate in an intra-frequency dual connectivity mode.

Transmitting the results of the performed beam measurement may comprise transmitting the results to at least one of the at least one second node.

The at least one second node may comprise at least a first parent node and a second parent node, wherein the determining of the one or more downlink beams that can be received simultaneously with the beam of the at least one third node may comprise determining at least one downlink beam of the first parent node and at least one downlink beam of the second parent node that can be received simultaneously.

In accordance with one example embodiment, an apparatus may comprise: circuitry configured to perform: performing, with a first node, beam measurement for downlink beams received with the first node from at least one second node; scheduling, with the first node, at least one third node for uplink transmission to the first node; determining, with the first node, one or more of the downlink beams that can be received simultaneously with a beam of the at least one third node based, at least partially, on the scheduling of the at least one third node and the performing of the beam measurement; and transmitting, with the first node, results of the performed beam measurement, wherein the results may comprise an indication of the one or more determined downlink beams that can be received simultaneously with the beam of the at least one third node.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: performing beam measurement for downlink beams received with the apparatus from at least one second node; scheduling at least one third node for uplink transmission to the apparatus; determining one or more of the downlink beams that can be received simultaneously with a beam of the at least one third node based, at least partially, on the scheduling of the at least one third node and the performing of the beam measurement; and transmitting results of the performed beam measurement, wherein the results may comprise an indication of the one or more determined downlink beams that can be received simultaneously with the beam of the at least one third node.

In accordance with one example embodiment, a non-transitory computer-readable medium comprising program instructions stored thereon which, when executed with at least one processor, cause the at least one processor to: perform beam measurement for downlink beams received from at least one second node; schedule at least one third node for uplink transmission; determine one or more of the downlink beams that can be received simultaneously with a beam of the at least one third node based, at least partially, on the scheduling of the at least one third node and the performing of the beam measurement; and transmit results of the performed beam measurement, wherein the results may comprise an indication of the one or more determined downlink beams that can be received simultaneously with the beam of the at least one third node.

In accordance with one aspect, an example method may be provided comprising: transmitting, to a first node, an indication of one or more resources a second node is configured to use for downlink transmission; receiving, from the first node, beam reporting for the one or more resources, wherein the beam reporting may comprise an indication of at least one resource of the one or more resources that can be received with the first node; activating one or more of the at least one indicated resource; and performing downlink transmission, to the first node, with the one or more activated resources.

The example method may further comprise: receiving, from the first node, an update to the indication of the at least one resource of the one or more resources that can be received with the first node; activating one or more of the at least one updated resource; and performing downlink transmission, to the first node, with the one or more activated updated resources.

The indication of the at least one resource that can be received with the first node may comprise at least one of: a multiplexing mode of the first node, one or more restrictions for downlink transmission, an indication that there is no restriction for downlink transmission, an indication of one or more reference beams, an indication of one or more reference beam pairs, a beam pair configured to support intra-frequency dual connectivity, or an indication based on the performing of the beam measurement.

The indication of the one or more resources the second node is configured to use for downlink transmission may comprise one or more beams the second node is configured to use for downlink transmission.

The example method may further comprise: forwarding the received beam reporting to at least one fourth node.

The example method may further comprise: receiving, from at least one fourth node, an indication of one or more resources at least one fourth node is configured to use for downlink transmission; and transmitting, to the first node, the indication received from the at least one fourth node.

In accordance with one example embodiment, an apparatus may comprise: at least one processor; and at least one memory including computer program code; the at least one memory and the computer program code configured to, with the at least one processor, cause the apparatus to: transmit, to a first node, an indication of one or more resources a second node is configured to use for downlink transmission; receive, from the first node, beam reporting for the one or more resources, wherein the beam reporting may comprise an indication of at least one resource of the one or more resources that can be received with the first node; activate one or more of the at least one indicated resource; and perform downlink transmission, to the first node, with the one or more activated resources.

The example apparatus may be further configured to: receive, from the first node, an update to the indication of the at least one resource of the one or more resources that can be received with the first node; activate one or more of the at least one updated resource; and perform downlink transmission, to the first node, with the one or more activated updated resources.

The indication of the at least one resource that can be received with the first node may comprise at least one of: a multiplexing mode of the first node, one or more restrictions for downlink transmission, an indication that there is no restriction for downlink transmission, an indication of one or more reference beams, an indication of one or more reference beam pairs, a beam pair configured to support intra-frequency dual connectivity, or an indication based on the performing of the beam measurement.

The indication of the one or more resources the second node is configured to use for downlink transmission may comprise one or more beams the second node is configured to use for downlink transmission.

The example apparatus may be further configured to: forward the received beam reporting to at least one fourth node.

The example apparatus may be further configured to: receive, from at least one fourth node, an indication of one or more resources at least one fourth node is configured to use for downlink transmission; and transmit, to the first node, the indication received from the at least one fourth node.

In accordance with one example embodiment, an apparatus may comprise: circuitry configured to perform: transmitting, to a first node, an indication of one or more resources a second node is configured to use for downlink transmission; receiving, from the first node, beam reporting for the one or more resources, wherein the beam reporting may comprise an indication of at least one resource of the one or more resources that can be received with the first node; activating one or more of the at least one indicated resource; and performing downlink transmission, to the first node, with the one or more activated resources.

In accordance with one example embodiment, an apparatus may comprise means for performing: transmitting, to a first node, an indication of one or more resources a second node is configured to use for downlink transmission; receiving, from the first node, beam reporting for the one or more resources, wherein the beam reporting may comprise an indication of at least one resource of the one or more resources that can be received with the first node; activating one or more of the at least one indicated resource; and performing downlink transmission, to the first node, with the one or more activated resources.

In accordance with one example embodiment, a non-transitory computer-readable medium comprising program instructions stored thereon which, when executed with at least one processor, cause the at least one processor to: transmit, to a first node, an indication of one or more resources a second node is configured to use for downlink transmission; receive, from the first node, beam reporting for the one or more resources, wherein the beam reporting may comprise an indication of at least one resource of the one or more resources that can be received with the first node; activate one or more of the at least one indicated resource; and perform downlink transmission, to the first node, with the one or more activated resources.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A method comprising:
performing, with a first node, beam measurement for downlink beams received with the first node from at least one second node;
scheduling, with the first node, at least one third node for uplink transmission to the first node;
determining, with the first node, one or more of the downlink beams that can be received simultaneously with a beam of the at least one third node based, at least partially, on the scheduling of the at least one third node and the performing of the beam measurement; and
transmitting, with the first node, results of the performed beam measurement, wherein the results comprise an indication of the one or more determined downlink beams that can be received simultaneously with the beam of the at least one third node.

2. The method of claim 1, further comprising:
receiving, with the first node, a configuration from the at least one second node, wherein the transmitting of the results of the performed beam management is based, at least partially, on the received configuration.

3. The method of claim 1, wherein the first node comprises an integrated access and backhaul node divided into a mobile termination and a distributed unit, wherein the transmitting with the first node is performed with the mobile termination, wherein the scheduling of the at least one third node is performed with the distributed unit.

4. An apparatus comprising:
at least one processor; and
at least one memory storing instructions that, when executed with the at least one processor, cause the apparatus to:
perform beam measurement for downlink beams received with the apparatus from at least one second node;
schedule at least one third node for uplink transmission to the apparatus;
determine one or more of the downlink beams that can be received simultaneously with a beam of the at least one third node based, at least partially, on the scheduling of the at least one third node and the performing of the beam measurement; and
transmit results of the performed beam measurement, wherein the results comprise an indication of the one or more determined downlink beams that can be received simultaneously with the beam of the at least one third node.

5. The apparatus of claim 4, wherein the instructions, when executed with the at least one processor, cause the apparatus to:
receive a configuration from the at least one second node, wherein the transmitting of the results of the performed beam management is based, at least partially, on the received configuration.

6. The apparatus of claim 4, wherein the instructions, when executed with the at least one processor, cause the apparatus to:
simultaneously receive a downlink beam from at least one of the at least one second node and an uplink beam from at least one of the at least one third node.

7. The apparatus of claim 4, wherein determining the one or more of the downlink beams that can be received simultaneously with the beam of the at least one third node is based, at least partially, on a reception panel configuration of the apparatus.

8. The apparatus of claim 4, wherein transmitting the results of the performed beam measurement further comprises the instructions, when executed with the at least one processor, cause the apparatus to:
transmit at least one of:
a multiplexing mode of the apparatus
one or more restrictions for the downlink beams,
an indication that there is no restriction for the downlink beams,
an indication of one or more reference beams,
an indication of one or more reference beam pairs,
a beam pair configured to support intra-frequency dual connectivity, or
an indication based on the performing of the beam measurement.

9. The apparatus of claim 4, wherein the instructions, when executed with the at least one processor, cause the apparatus to:
operate in one of:
a time division multiplexing mode, or
a spatial division multiplexing mode.

10. The apparatus of claim 4, wherein the instructions, when executed with the at least one processor, cause the apparatus to:
transmit, to the at least one third node, an uplink grant configuration, wherein the determining of the one or more of the downlink beams that can be received simultaneously with the beam of the at least one third node is based, at least partially, on one or more panels of the apparatus indicated with the uplink grant configuration.

11. The apparatus of claim 4, wherein the downlink beams and the beam of the at least one third node are associated with frequencies that overlap.

12. The apparatus of claim 4, wherein the instructions, when executed with the at least one processor, cause the apparatus to:
operate in an intra-frequency dual connectivity mode.

13. The apparatus of claim 4, wherein transmitting the results of the performed beam measurement comprises the instructions, when executed with the at least one processor, cause the apparatus to:
transmit the results to at least one of the at least one second node.

14. The apparatus of claim 4, wherein the at least one second node comprises at least a first parent node and a second parent node, wherein the determining of the one or more downlink beams that can be received simultaneously with the beam of the at least one third node comprises the instructions, when executed with the at least one processor, cause the apparatus to:
determine at least one downlink beam of the first parent node and at least one downlink beam of the second parent node that can be received simultaneously.

15. An apparatus comprising:

at least one processor; and at least one storing instructions that, when executed with the at least one processor, cause the apparatus to:

transmit, to a first node, an indication of one or more resources a second node is configured to use for downlink transmission;

receive, from the first node, beam reporting for the one or more resources, wherein the beam reporting comprises an indication of at least one resource of the one or more resources that can be received with the first node simultaneously with a beam of a third node;

activate one or more of the at least one indicated resource; and perform downlink transmission, to the first node, with the one or more activated resources.

16. The apparatus of claim 15, wherein the the instructions, when executed with the at least one processor, cause the apparatus to:

receive, from the first node, an update to the indication of the at least one resource of the one or more resources that can be received with the first node simultaneously with the beam of the third node;

activate one or more of the at least one updated resource; and perform downlink transmission, to the first node, with the one or more activated updated resources.

17. The apparatus of claim 15, wherein the indication of the at least one resource that can be received with the first node simultaneously with the beam of the third node comprises at least one of:

a multiplexing mode of the first node, one or more restrictions for downlink transmission, an indication that there is no restriction for downlink transmission, an indication of one or more reference beams, an indication of one or more reference beam pairs, a beam pair configured to support intra-frequency dual connectivity, or an indication based on the performing of the beam measurement.

18. The apparatus of claim 15, wherein the indication of the one or more resources the second node is configured to use for downlink transmission comprises one or more beams the second node is configured to use for downlink transmission.

19. The apparatus of claim 15, wherein the instructions, when executed with the at least one processor, cause the apparatus to:

forward the received beam reporting to at least one fourth node.

20. The apparatus of claim 15, wherein the instructions, when executed with the at least one processor, cause the apparatus to:

transmit, with the second node to the first node, a further indication of one or more resources at least one fourth node is configured to use for downlink transmission.

* * * * *